US005870380A

United States Patent [19]

Diehl et al.

[11] Patent Number: 5,870,380

[45] Date of Patent: Feb. 9, 1999

[54] METHOD AND APPARATUS FOR RECEPTION OF SIGNALS FROM SEVERAL TRANSMITTERS WHEREIN EACH TRANSMITTER IS CHARACTERIZED BY THEIR OUTPUT PULSE TRAIN

[75] Inventors: Eric Diehl, Chantepie; Yves Maetz, Rennes; Nour-Eddine Tazine, Noyal sur Vilaine, all of France

[73] Assignee: Thomson Multimedia S.A., Courbevoie, France

[21] Appl. No.: 645,949

[22] Filed: May 14, 1996

[51] Int. Cl.[6] .................................. H04J 7/00; H04J 9/00; H04N 5/44

[52] U.S. Cl. .......................... 370/212; 370/213; 370/205; 375/238; 375/239; 348/734; 332/109; 332/112

[58] Field of Search .................................... 370/212, 213, 370/205; 375/238, 239, 237; 340/870.24; 332/109, 112; 329/312, 313; 348/734, 723, 724

[56] References Cited

U.S. PATENT DOCUMENTS

| | | | |
|---|---|---|---|
| 4,345,323 | 8/1982 | Chang | 370/212 |
| 4,357,634 | 11/1982 | Chung | 375/239 |
| 4,980,884 | 12/1990 | Chang | 375/238 |
| 5,504,279 | 4/1996 | Sizer, II | 375/239 |
| 5,724,357 | 3/1998 | Derks | 375/238 |

FOREIGN PATENT DOCUMENTS 2674658 10/1992 France .

OTHER PUBLICATIONS

Patent Abstracts of Japan vol. 009 No. 208 (E–338), 24 Apr. 1985 & JP–A–60 072499 (Sony KK) 24 Apr. 1985.

Elektor Electronics, vol. 17, No. 192, Sep. 1, 1991 London, GB pp. 34–38, "Remote Control ICS MV500 and MV601 Plessey Semiconductors".

Copy of Search Report.

Motorola's "Clone Clear" product literature, Aug. 14, 1994.

Corsair Communications "PhonePrint (tm)", pp: 1–26 (numbered by examiner) original pp. 4,10, and 16 (numbered by Corsair) are missing, May 1995.

*Primary Examiner*—Douglas W. Olms
*Assistant Examiner*—David R Vincent
*Attorney, Agent, or Firm*—Joseph S. Tripoli; Peter M. Emanuel; Robert D. Shedd

[57] ABSTRACT

The disclosure relates to a method of reception of signals from at least two transmitters (RCi), wherein for each transmitter the data ("0", "1") are represented by the time interval (T0i, T1i) between two consecutive pulses transmitted by this transmitter, said time intervals and the pulse widths (Tpi) being characteristic of each transmitter, and wherein said method includes the following steps: reception of a resultant signal that is the sum of the signals from by said transmitters; determination of the parameters of said resultant signal, these parameters including the width and spacing of the pulses; analysis of said parameters and assignment of a data item to one of said transmitters. The invention also concerns a receiver device, a remote controller, and a system of reception. The invention is applicable notably in the field of television and video.

23 Claims, 14 Drawing Sheets t
t
t
Tp1
T01
T11
Tr1
Tp2
T02
T12
Tr2
RC1
RC2
REC.

METHOD AND APPARATUS FOR RECEPTION OF SIGNALS FROM SEVERAL TRANSMITTERS WHEREIN EACH TRANSMITTER IS CHARACTERIZED BY THEIR OUTPUT PULSE TRAIN

BACKGROUND OF THE INVENTION

The invention relates to a method and device for reception of signals from several transmitters, for example infra-red transmitters such as remote controller of audiovisual devices. The invention also relates to a remote controller used in conjunction with this device, and to a system including a receiver device and several transmitters. The invention is applicable notably in the field of video and television.

DESCRIPTION OF THE PRIOR ART

Many electronic devices available to the general public can be controlled by a cordless remote controller that transmits control signals to a receiver incorporated in the device to be controlled. This transmission generally makes use of infrared, ultrasound or radio signals, the data being carried on a suitable carrier signal.

In some cases it can be useful to be able to use several such remote controller simultaneously on the same receiver. The problem of interference between these signals received simultaneously then arises, and also the problem of identification of each remote controller be the receiver.

The Utility Certificate application n°FR 2 698 979 describes a system involving several remote controllers and a single receiver.

SUMMARY OF THE INVENTION

The object of the invention is a method of reception of signals from at least two transmitters (RCi), wherein each transmitter transmits data items ("0", "1") represented by the time interval (T0i, T1i) between two consecutive pulses transmitted by this transmitter, said time intervals and the pulse widths (Tpi) being characteristic of each transmitter, and wherein said method includes the following steps:

- reception of a resultant signal that is the sum of the signals from said transmitters;
- determination of the parameters of said resultant signal, these parameters including the width and spacing of the pulses;
- analysis of said parameters and assignment of a data item to one of said transmitters.

The fact that each transmitter is characterized by pulses of different width and spaced at different time intervals enables effective decomposition of said resultant signal into its component signals.

In a particular embodiment, the data are constituted by bits that can take two values.

In a particular embodiment, a status variable is managed for each transmitter, this variable representing the current status of a message received from the transmitter.

In a particular embodiment, the possible values of said status variable are "Waiting for a first bit of a message", "Waiting for more bits", "Waiting for the end of the message" and "Waiting for the end of the relax time between two messages".

In a particular embodiment, a first bit is detected for a given transmitter when the time interval between the current pulse and a pulse among the pulses previously received is equal to one of the intervals defining a bit value for said given transmitter and when the width of said pulse previously received is equal to the pulse width of said given transmitter.

In a particular embodiment, the comparison of the time interval between said two pulses with the intervals defining a bit value for said transmitter is performed by increasing intervals defining a data item, all pulses previously received and stored being examined for each interval defining a bit value.

In a particular embodiment, the intervals defining a bit value being two in number, if no bit is detected but the shortest duration corresponding to a bit value is equal to the time interval separating the current pulse and a pulse previously received, then the bit value detected corresponds to this shortest duration.

In a particular embodiment, a given transmitter is considered as the source of a first bit of a message only when the width of the current pulse is greater than or equal to the pulse width for this transmitter.

In a particular embodiment, when at least one bit has been assigned to a transmitter, another bit is assigned to this same transmitter if the interval between the last pulse enabling a bit to be assigned to this transmitter and the current pulse corresponds to the bit interval for this transmitter.

In a particular embodiment, a given transmitter is considered as the source of a supplementary bit of a message only when the width of the current pulse is greater than or equal to the pulse width for this transmitter.

In a particular embodiment, if the analysis of a current pulse does not enable a bit to be assigned to a transmitter then this pulse is assigned to the first transmitter to which no bit has been assigned, in the decreasing order of pulse widths, said pulse thus assigned then defining the starting point of a bit whose second pulse will arrive later.

In a particular embodiment, when the number of bits assigned to a transmitter is equal to the maximum number of bits in a message, but another bit is nevertheless detected for this transmitter, then the first bit of the message is eliminated, and the last bit detected is added to said message.

In a particular embodiment, if the analysis of a current pulse does not enable a bit to be assigned to a transmitter but this current pulse forms with the last-but-one pulse stored an interval corresponding to a bit value of a given transmitter, and if at least one bit has already been assigned to this transmitter, then the last bit assigned to this transmitter is replaced by the new value detected In a particular embodiment, if a current pulse could not be used before, then we search for a transmitter to which only one bit has been assigned and determine whether the interval between the current pulse and the first pulse assigned to said transmitter corresponds to a bit value for said transmitter, and if so then the bit value is assigned to said transmitter.

In a particular embodiment, the parameters of each pulse received are memorized after analysis of the pulse.

In a particular embodiment:

- the transition from the state "Waiting for first bit" to the state "Waiting for more bits" is made when a bit is detected;
- the transition from the state "Waiting for more bits" to the state "Waiting for end of message" is made when the maximum number of bits corresponding to a message has been assigned to a transmitter;
- the transition from the state "Waiting for end of message" to the state "Waiting for relax time" is made if no bit corresponding to the transmitter in question is received after a period exceeding the longest interval corresponding to a bit from this transmitter;

the transition from the state "Waiting for relax time" to the state "Waiting for first bit" is made when the period since the last bit received exceeds the relax time (Trn) of the transmitter in question;

the transition from the state "Waiting for more bits" to the state "Waiting for first bit" is made when, after assignment of a first bit, no other bit corresponding to the transmitter in question is received after a period exceeding the longest interval for data from this transmitter.

Another object of the invention is a device for receiving the characteristic signals of the transmitters, including:

means of reception of a resultant signal that is the sum of the signals transmitted by at least two transmitters, the data (0,1) from each transmitter being defined by the time interval between consecutive pulses, said time interval along with the pulse width being characteristic of each transmitter;

means of analysis of said resultant signal based on the pulse widths detected in this resultant signal and the time intervals between these pulses.

In a particular embodiment, the pulse widths detected are equal or proportional to the widths of the pulses transmitted by said transmitters.

In a particular embodiment, said means of reception include an infra-red receiver, said transmitters transmitting infra-red signals and all using the same carrier.

In a particular embodiment, said means of analysis include a microprocessor, a memory used to store the parameters of pulses received, and other memories used to store the bits corresponding to the messages from said transmitters.

In a particular embodiment, said receiving device implements the method of reception of signals according to the invention.

Another object of the invention is an infrared remote controller that is used in conjunction with a receiving device according to the invention and that includes means of adjusting the width of the pulses used to represent the data transmitted to said receiving device, this adjustment being made such that said pulse widths are always unique with respect to other remote controller that might be used at the same time.

In a particular embodiment, said remote controller also includes means of adjusting the time intervals between two pulses that represent the data (0,1) being transmitted.

Another object of the invention is a system of reception of signals, including:

at least two transmitters, each transmitter representing data in the form of pulses whose width is characteristic of said transmitter, data being defined by the time interval separating two consecutive pulses transmitted by this transmitter, said interval also being characteristic of each transmitter;

a receiver including means of reception of the resultant signal that is the sum of the signals from said transmitters;

means of analysis of said resultant signal based on the pulse widths detected in said resultant signal and the time intervals between these pulses.

In a particular embodiment, said system of reception of signals implements the method of reception of signals according to the invention.

BRIEF DESCRIPTION OF THE DRAWINGS

The invention will be better understood and other advantages and characteristics will become clear on reading the following description of an embodiment, taken only as a non-limitative example, making reference to the appended figures, of which.

The description below refers sometimes to the general case of N remote controllers, and sometimes to the particular case of N=2, depending on which reference permits a clearer explanation.

In this embodiment two remote controllers RC1 and RC2 are used, emitting infra-red signals on the same carrier frequency (for example, 400 KHz in Europe or 56.8 KHz in the USA) and using the same communication protocol. Data are transmitted as modulations of the carrier. The invention is obviously not limited to infra-red transmission.

Figures 1A, 1B, 1C:
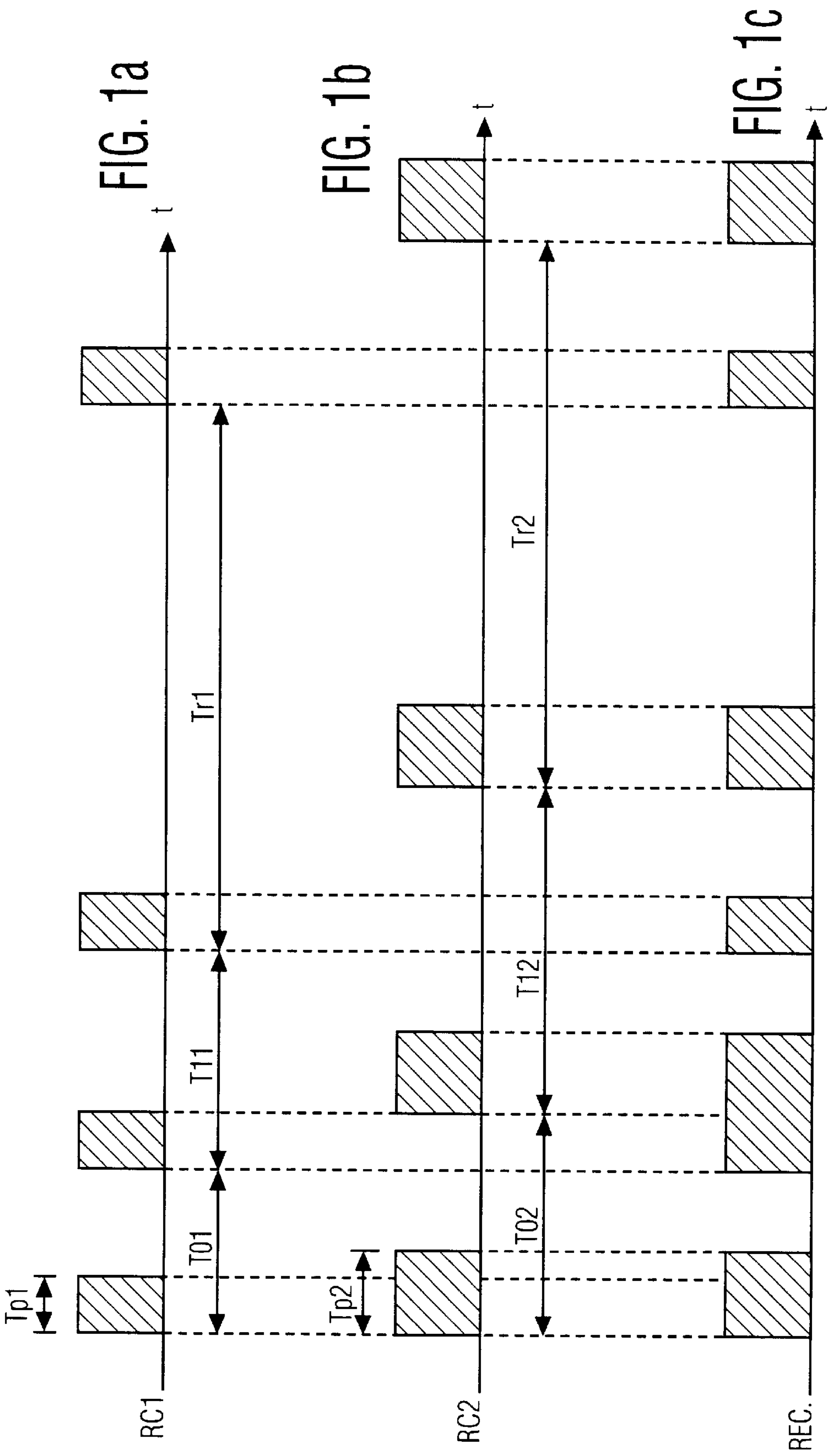
FIGS. 1*a* and 1*b* show signals transmitted by two remote controllers in an embodiment of the invention.
FIG. 1*c* shows the resultant signal perceived by the receiver, this signal being the superposition of the signals in FIGS. 1*a* and 1*b;*

FIG. 1*a* illustrates the coding of messages (in the form of a sequence of bits) used by the first remote controller RC1. The following four parameters are used to characterize the signals transmitted by RC1:

the duration Tp1 defines the pulse width (duration);

the duration of T01 between the rising edges of two successive pulses defines the logical value "0";

the duration of T11 between the rising edges of two successive pulses defines the logical value "1";

the duration Tr1 defines a pause or "relax time" which is the minimum time interval between two messages.

FIG. 1*b* is similar to FIG. 1: it illustrates the coding messages for a second remote controller RC2. In a generalized description, the index n relates to the remote controller RCn.

In the present embodiment, we assume that Tp1<Tp2 (this can always be true, simply by numbering the remote controllers in the order of increasing pulse width).

FIG. 1*c* illustrates the signal perceived by a single infra-red sensor; it corresponds to the superposition of the signals of FIGS. 1*a* and 1*b*. We notice that the first pulse from RC1 is occupied by the first pulse from RC2, whereas the second pulses from RC1 and RC2 partially overlap to form a wide pulse.

As we shall see in detail later, the difference in pulse width between the various remote controllers plays a major role in the extraction from the superposed signal of the data from each remote controller.

Figure 2:
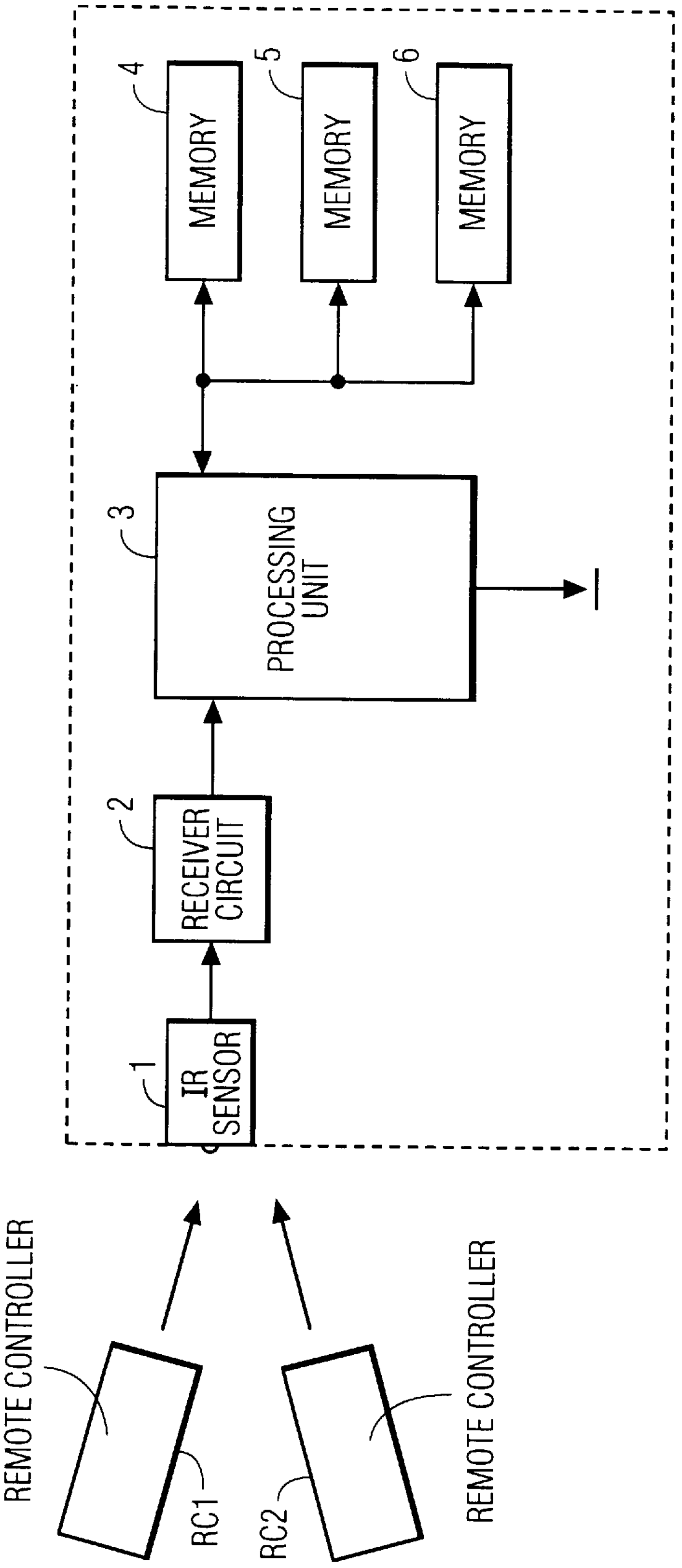
FIG. 2 is a block diagram of a receiver device implementing the embodiment of the invention.

FIG. 2 is a block diagram of a receiving device implementing the present embodiment. This device includes an infra-red sensor 1, controlled by a specific receiver circuit 2. This circuit 2 outputs a signal which, in the description which follows, will be assumed to be similar to the one in FIG. 1*c*. The specific circuit 2 is connected to a processing unit 3, which could be, for example, a ST90E30-type micro-controller (made by SGS Thomson). The functions of the circuits 1 and 2 could be provided, for example, by a GP1U527Y circuit (made by Sharp).

In a particular embodiment, when the receiver circuit 2 receives a pulse from the infra-red sensor 1, it output a pulse whose duration is substantially proportional to that of the pulse received. In other words, a pulse of duration T sent by a remote controller is perceived as a pulse of duration $\mu T$, where $\mu$ is a correction coefficient. The relation of order between of the pulses of different width at the input of the receiver is therefore maintained during the processing of the signals. If the coefficient $\mu$ is not known precisely, i.e. $\mu T$ can take a range of values, then precautions will be taken to avoid any overlapping of these ranges, by choosing suitable pulse widths for each of the transmitters.

The processing unit 3 manages, amongst other things, three random access memories (RAM) 4 to 6. These memories are shown separately in the diagram, but may physically be parts of the same circuit.

The first memory, 4, is used to store the data arriving from the infra-red receiver. Two data items are recorded for each pulse: the duration of the pulse (denoted Pulse_mem[i]), and the absolute time of arrival of the rising edge of this pulse (denoted Start_mem[i]). These two data items define completely the signal received.

In the present embodiment, the memory 4 can store the data for at least 2*N−1 pulses. It is used in a "first-in-first-out" (FIFO) manner; the index i has the value 0 for the last pulse memorized and increases for pulses received earlier.

The two other memories, 5 and 6, are each assigned to one of the remote controller. Before being written in the memory 4 (whose content records the sequence of pulses received), the data are processed by the processing unit 3. The result of this analysis is generally the identification of a bit of information for a particular remote controller, which is then stored in the memory corresponding to this remote controller. However, it may be necessary to delete a bit in one of the memories if it is realized later that data received earlier has been incorrectly analyzed.

Figure 3:
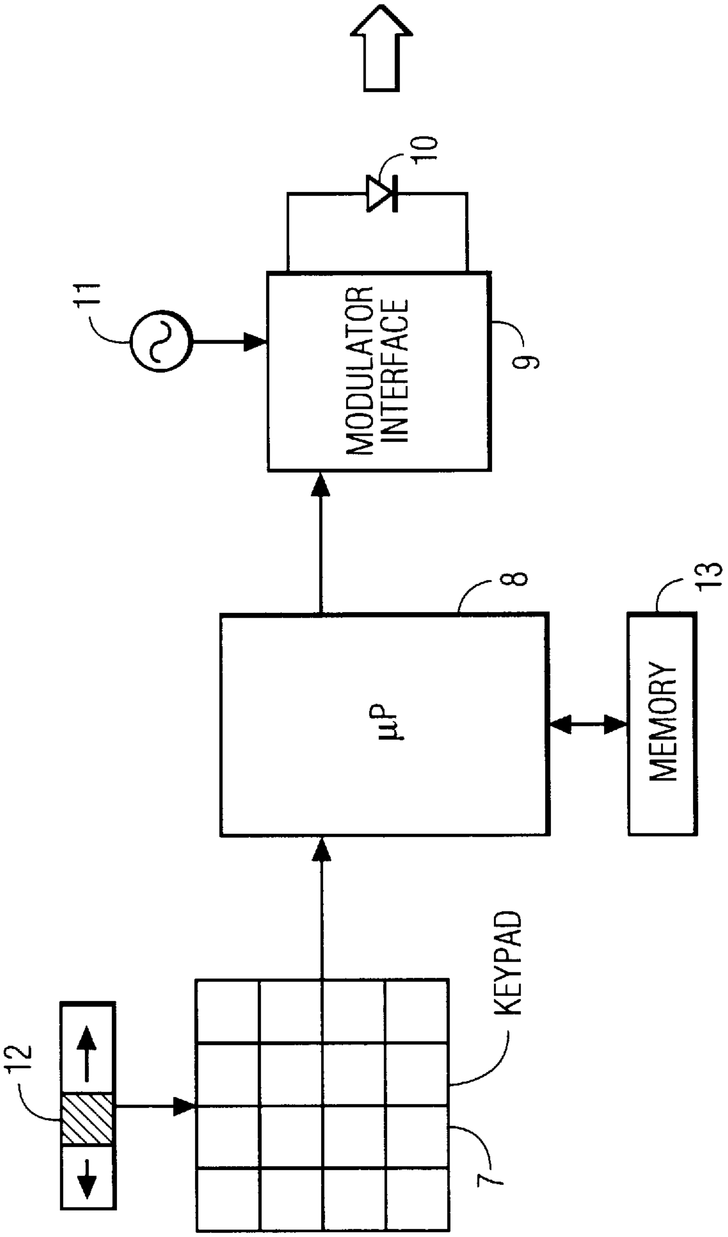
FIG. 3 is a block diagram of an example of a remote controller used in the embodiment.

FIG. 3 shows a block diagram of one of the remote controllers. A keypad 7 is connected to a processor 8 which manages in a known manner the modulator interface 9 with the emitting diode 10. The processor 8 is, for example, a Motorola 68HC05C8 micro-controller. An oscillator 11 provides the carrier frequency to the modulator interface 9.

In a particular variant of the embodiment, the keypad of the remote controller has means of changing the width of the pulses transmitted by this remote controller and/or of the time intervals between rising edges of two pulses used to code a bit. This change is carried out by setting a switch 12 to one of N different positions. The pulse widths Tp, and the durations T0i and T1i for the various positions of the switch are memorized in a memory 13 managed by the micro-controller 8. In this way it is easy to use a new remote controller in an existing system with several remote controllers simply by choosing parameters different from those used by other controllers.

The processing unit 3 assigns a state and a counter for each remote controller. There are four different states:

(A)—Waiting for the first bit of a message (B)—Waiting for a more bits of a message (C)—Waiting for the end of a message (D)—Waiting for the relax time.

The counter indicates the number of bits stored in the corresponding memory.

The states and counters are managed by the processing unit 3.

Figure 4:
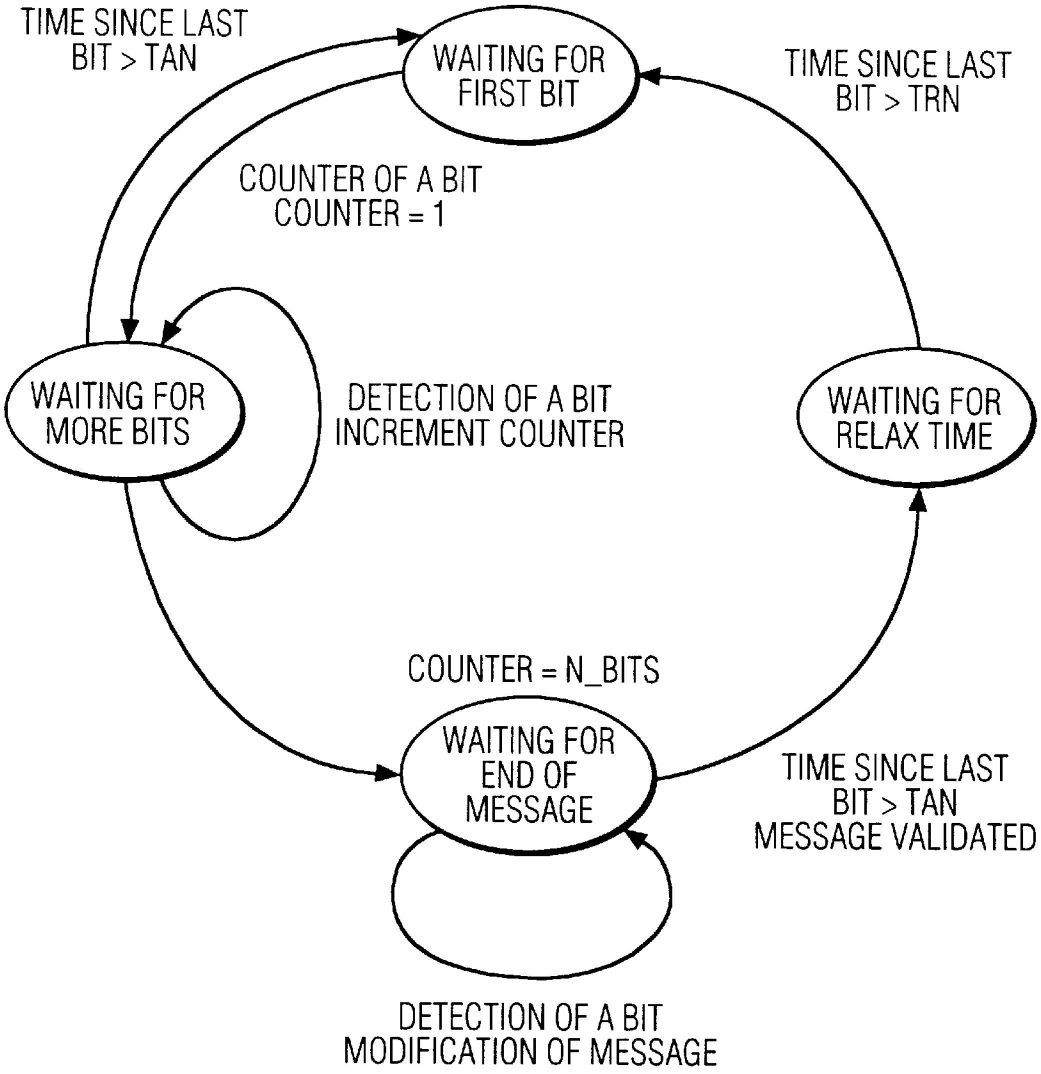
FIG. 4 is a diagram showing the status of a stack used to store bits corresponding to a message from a remote controller, according to the present embodiment, there being one stack for each remote controller.

FIG. 4 illustrates the transitions between four different states.

In state A, no bit has yet been detected for a remote controller, so no message has started.

In state B, at least a first bit has been received, but the expected number of bits per message (N_Bits) has not yet been received. For example, N_Bits is equal to 8 bits.

In state C, the expected number of bits in the message (N_Bits) has been received. If another bit is detected later for this message, an analysis error must have been made earlier, so the stored message is consequently modified.

In state D, we try to detect the relax time Trn, which is the minimum time that should precede another message from a given controller after the end of a message.

For the state associated with remote controller n, the transition from the state A to state B occurs when a bit has been detected for this remote controller. The bit counter is then 1.

The transition from state B to state C occurs when the bit counter reaches N_Bits.

The transition from state C to state D occurs if after a waiting for a time Tan, where Tan=max(T0n, T1n), no bit is identified for this remote controller. In the present embodiment, Tan=T1n.

The transition from state D to state A occurs when the time elapsed since the last bit received is greater than the relax time Trn.

It is also possible to go from state B to state A if, after the reception of the first bit, a time Tan elapses without another bit being detected for this remote controller.

Figure 5:
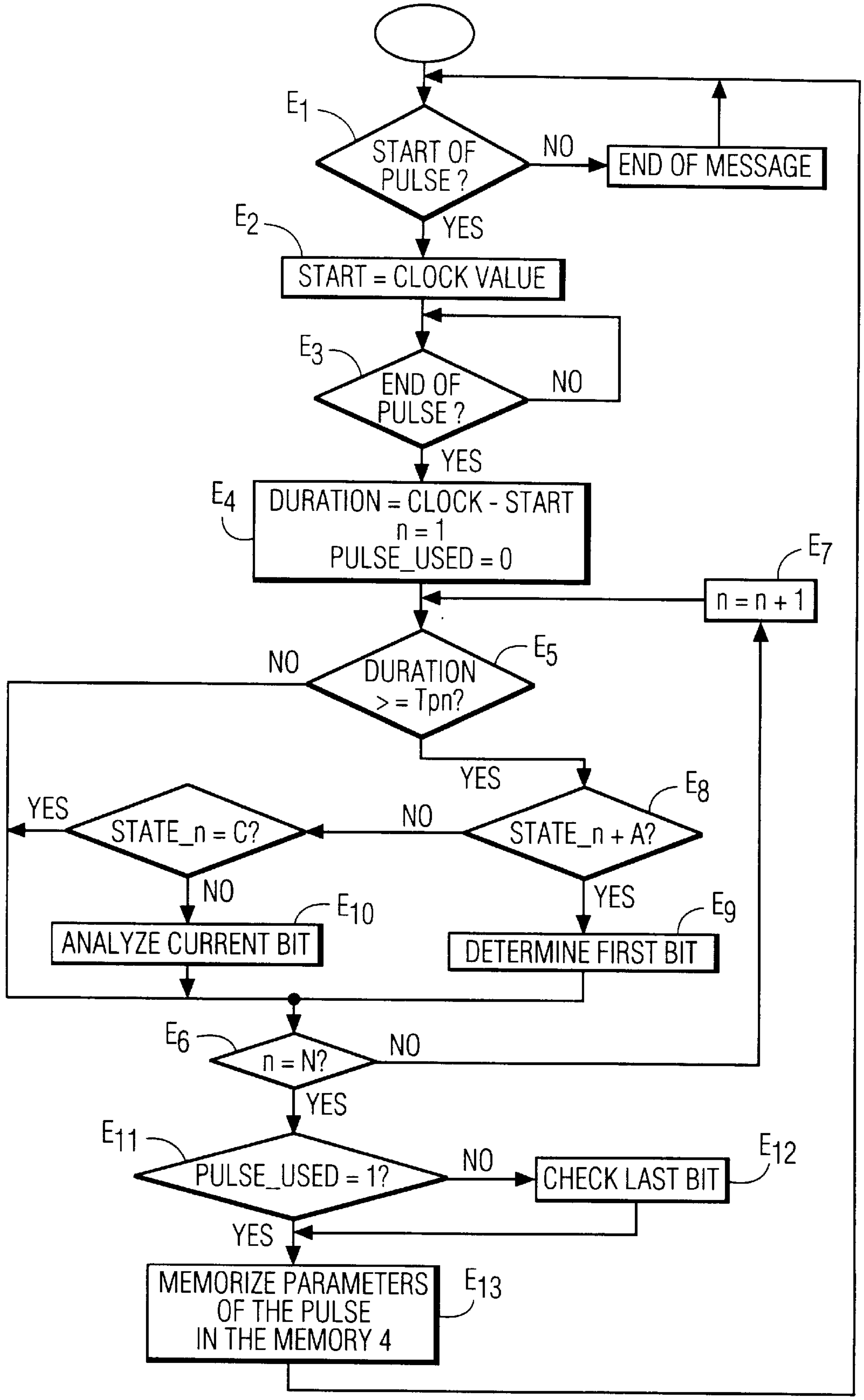
FIG. 5 is a general flow chart of the procedure used to acquire and analyze the data received by the infra-red receiver.

FIG. 5 is a flow chart of the present embodiment of the method used to acquire and analyze the data output by the infra-red receiver 2. This flow chart is a general one; various sub-routines will be described in detail later with reference to other figures.

The stages E1 to E4 concern the acquisition of the parameters characterizing the signal received. A start of pulse (rising edge) is detected by the processing unit 3 in the first stage. The state of a real-time clock is memorized in a variable "Start" in stage E2. The processing unit waits until the end of this pulse (falling edge) and determines its width (variable "Duration"). A Boolean variable ("Pulse_used") indicates whether or not the pulse was assigned to a particular remote controller and therefore used to assign a bit.

We recall that the remote controllers are numbered in increasing order of their pulse widths Tpn. In stages E5 to E10, the processing unit attempts to assign a pulse detected to one of the remote controllers (taking the controllers one by one in the order of their numbers).

Stage E5 compares detected pulse width "Duration" with the pulse width Tpn corresponding to the current remote controller.

If "Duration" is strictly less than Tpn, then it is certain that this detected pulse cannot be assigned to the remote controller n. So we consider the next remote controller (stages E6 and possibly E7) if all the remote controllers have not yet been considered.

If "Duration" is greater than or equal to Tpn, an assignment still remains possible: either the pulse corresponds perfectly to Tpn, or may be masked by a wider pulse Tpn.

In this case we test the state of the remote controller n (stage E8). If this state is "Waiting for first bit" (state A), then the processing unit calls a first sub-routine "Determine first bit" (stage E9). Otherwise, we test for the state "Waiting for end of message" (state C). If this is the case, then we consider the next controller (stages E6 and E7) as described previously; if not, the analysis of the pulse is carried out using a second sub-routine "Analyze current bit" (stage E10). These two sub-routines will be examined in detail later with reference to FIGS. 6 and 7.

Stages E9 and E10 are followed by stage E6 that determines whether all the remote controllers have been considered. If this is the case, the procedure moves to stage E11. The parameter Pulse_used is then tested to see whether or not, during one of the specific sub-routines, it was possible to assign the pulse currently being analyzed to a remote controller, by analysis of the parameters of this current pulse. If not, this means that a previous bit has been incorrectly interpreted. A third sub-routine ("Check last bit", stage E12) is then used to correct this anomaly.

Once stages E11 and E12 are completed, the parameters of the current pulse are stored in the memory 4. The "Determine first bit"sub-routine is illustrated by the flow chart in FIG. 6. This sub-routine is executed for a remote controller n when its state is "Waiting for first bit" and when, a priori, the duration of the pulse just received is such that a pulse of duration Tpn corresponding to the remote controller n could be included in it.

The principles used by this sub-routine are the following: the pulse width T0n being less than T1n in the present example, we first try to determine whether the start of the current pulse could, in combination with a pulse previously stored in memory 4, form a "0" that could be a first bit for the remote controller n; this is performed by stages E101 to E109. If a "0" is not detected, we then look for a "1"; this is performed in stages E111 to E118.

Therefore it is not only the most recent pulse that we are trying to analyze (this pulse is not yet memorized in the memory 4). In the "Determine first bit" routine, we are essentially interested in the rising edge of this most recent pulse. To form a bit, two pulses are necessary.

Figure 7:
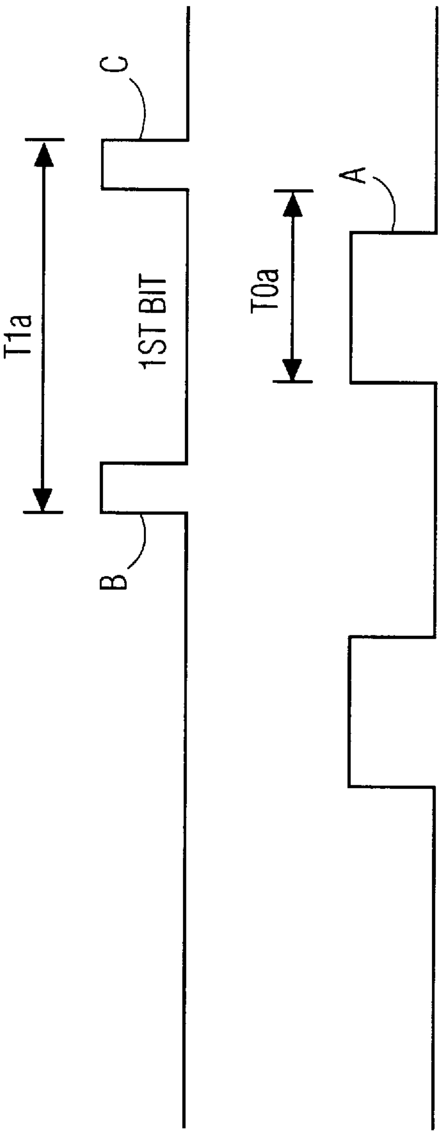
FIG. 7 shows a timing diagram illustrating a particular configuration of the signals sent by two remote controllers.

Stages E119 to E121 correspond to the processing of a special case in which we choose to recognize a "0" even though the usual conditions for this recognition are not quite satisfied. This special case, illustrated by FIG. 7, is flagged by means of the value of a variable called "PossibleZero". If this variable is null, this indicates that we are not in the special case (PossibleZero is initialized to this value).

Afterwards, we can distinguish the pulse width (Tpn) from the duration of a bit (T0n or T1n).

Stage E101 concerns the initialization of the loop used to check for the presence of a "0". Each pulse memorized is systematically analyzed, starting with the most recent (index i=0). We recall that the data stored in memory 4 give the pulse width and the time of arrival of its rising edge.

If the pulse width i is strictly less than Tpn, this pulse cannot have been sent by the remote controller n, since the pulse is too narrow (E102). In this case, we move to the next pulse (E106). If, on the other hand, a pulse of width Tpn could be contained in the pulse i, then we determine the duration of the corresponding bit. This duration (denoted Bit_Duration) is equal to the difference between the time of arrival of the rising edge of the current pulse (variable "Start") and the time of arrival of the rising edge of the pulse i (variable "Start_mem[i]") (stage E103).

If this bit width is not equal (to within the width of the error band, which the processing unit 3 always takes into account when making comparisons) to the duration of a "0" bit for this remote controller n, then the pulse is ignored and the next pulse is analyzed (stages E104, then E106 and E107). But if T0n and Bit_Duration are equal, then we check again if the pulse started in a relaxation interval Trn (E105).

If so, the pulse is ignored and the search is continued by incrementing i (E106).

If not, we check whether the width of the pulse i is equal (again to within the width of the error band) to the pulse width of the remote controller n (stage E108). If this is the case, then we identify a "0" (stage E109); otherwise, this means that width of the pulse i is strictly greater than T0n, so it is possible, though not obligatory, that the leading edge of a pulse corresponding to a "0" is masked by a wider pulse. The variable "PossibleZero" is then set to 1 and a search of a "1" is started (stage E111).

The timing diagram in FIG. 7 illustrates the special case that we would like to resolve by means of this mechanism. The first line of this figure corresponds to the first bit transmitted by a first remote controller, whose pulse width is Tpa, which is less than the pulse width Tpb of a second remote controller for which a transmission is shown on the second line of FIG. 7. The intervals T1a and T0a correspond to the bit durations of the first remote controller.

If a pulse A of the second remote controller falls between two rising edges of pulses B and C of the first remote controller such that the time between the rising edge of A and the rising edge of C is T0a, in the absence of a test on the duration of the pulse A (stage E108) we would erroneously detect a "0" bit.

This is not a problem if the pulse A masks a pulse from the first remote controller, but it is a problem when a "1", of longer duration then a "0", must be detected, as illustrated in FIG. 7, which is why we attempt to detect the presence of a "1". If this detection is not achieved after examining the content of the memory 4 and if the variable "PossibleZero" is true (=1), then a "0" is detected.

The detection of a "1" is quite similar to the detection of a "0": stages E101 to E107 correspond to the stages E111 to E117. The correction mechanism making use of the comparison stage E108 is not used for the detection of a "1". The test in stage E115 (corresponding to the stage E108) leads directly to the recognition of a "1" (stage E118).

When all the possibilities of detection of a "1" have been exhausted without success (test in stage E117 is positive), the state of the variable "PossibleZero" is tested, and a "0" bit recognized if this variable is 1. If the test is negative, then we exit directly from the routine via the stage E122.

Following the three cases where a "0" or "1" bit has been recognized, certain parameters must be updated (E110). First, the bit counter N_Bits_n associated with the remote controller n must be set to 1, indicating that a first bit has been detected for this remote controller at this time.

Next, the state (State_n) associated with the remote controller changes from "Waiting for first bit" (A) to "Waiting for more bits" (B).

Moreover, the last memorized pulse could be assigned. The variable Pulse_used is consequently set to "true".

Finally, we memorize in the variable Last_time_n the time of the rising edge of the current pulse ("Start").

After this update, we proceed to stage E122.

Returning to the general flow chart in FIG. 5, let us assume that the state associated with the remote controller n was not "Waiting for first bit" during stage E8. We then check whether this state corresponds to the "Waiting for more bits". This is the case, for example, when a bit has already been detected previously for the remote controller n. If this test is positive, then a specific analysis of the pulses memorized in memory 4 and the rising edge of the current pulse is carried out in stage E10 to determine whether a "0" or "1" bit can be assigned to the remote controller n.

Figure 8:
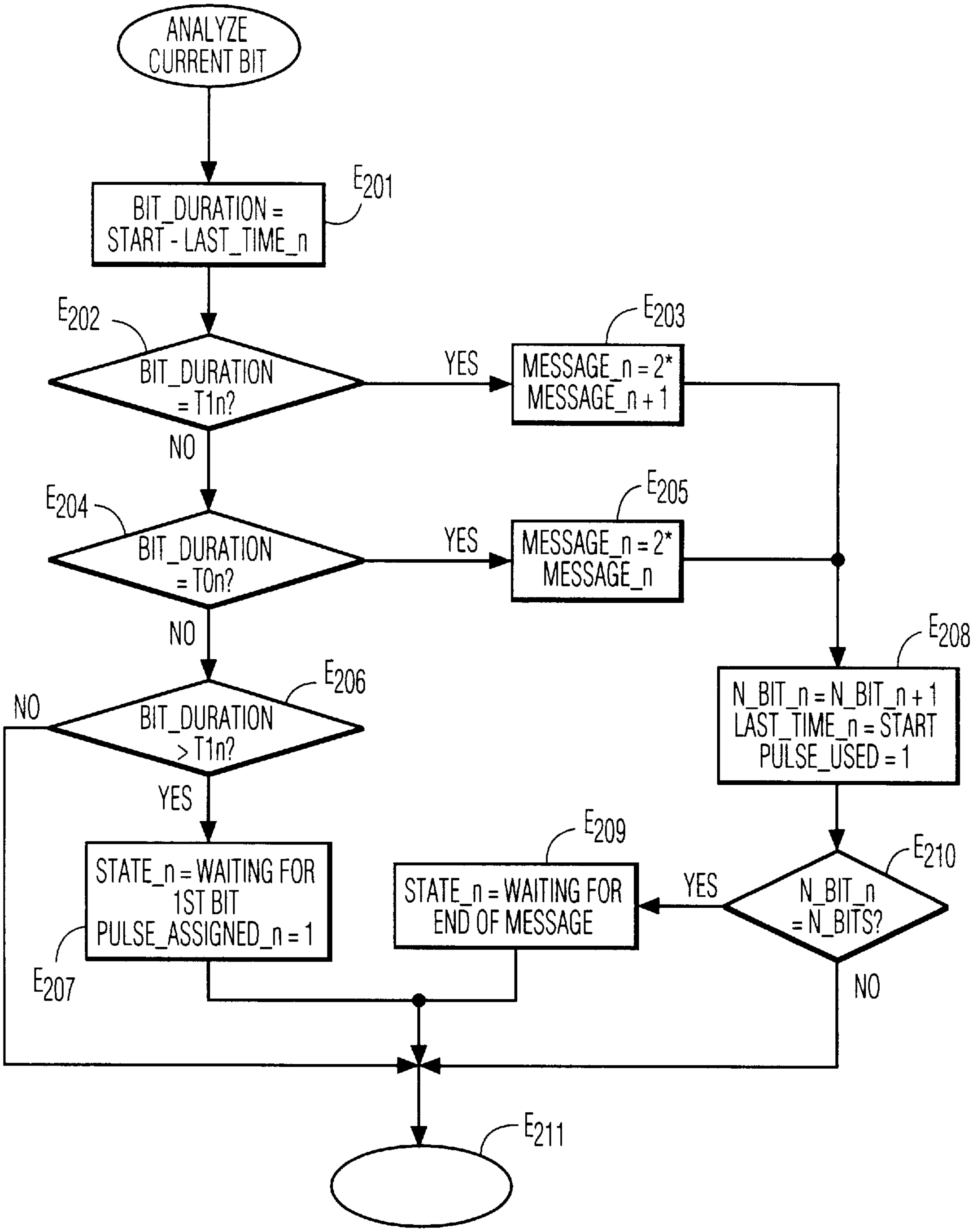
FIG. 8 is a flow chart corresponding to a second sub-routine ("Analyze current bit") of the procedure in FIG. 5.

FIG. 8 is a flow chart corresponding to the "Analyze current bit" routine.

When this routine is called for the remote controller n, it is certain that the state of this remote controller is "Waiting for more bits". At least one bit has already been assigned to this remote controller n and has been stored in the associated memory. Moreover, we know from the variable "Last_time_n" the time of the detection of the rising edge of the pulse used to assign the last bit memorized. Having this information and knowing the time of arrival of the rising edge of the current pulse that we determine the bit width Bit_Duration (stage E201). The purposes of the other stages is to determine if this bit corresponds to a supplementary bit sent by the remote controller n.

First, we compare the bit width Bit_Duration with T1n (logical "1") for the remote controller 1 (to within a certain margin of error) (E202). If the two widths are the same, then a logical "1" is identified and inserted in the stack corresponding to the remote controller n (stage E203).

If a "1" is not identified, then the bit width is compared with T0n (logical "0") (E204). If the two widths are the same, a logical "0" is identified and memorized in the corresponding memory (stage E205). After identification of either a logical "1" or a logical "0", the bit counter N_Bits_n is incremented, the variable Last_time_n is updated and the fact that the current pulse has been used is recorded by setting the variable Pulse_used to 1 (stage E208).

We then determine whether the message received and stored contains the maximum number of bits (N_Bits) (E210). If so, the state of the remote controller n is set to "Waiting for end of message" (E209). The routine then returns to the procedure of FIG. 5 (E211).

If the tests of the stages E202 and E204 prove to be negative, a third test is performed in stage E206. If the bit width Bit_Duration is strictly greater than T1n (which,in the present embodiment, is longer than T0n), then the bit width cannot correspond to a bit from the remote controller n, in which case we assume that the message of the remote controller n has been interrupted, and the state of the remote controller n then becomes "Waiting for first bit" (E207) and its memory stack is cleared. The variable "Pulse_assigned_n" is also set to 1 to indicate that the remote controller n has received its first pulse (but not yet its first bit, a bit being defined by two pulses).

If the test of the stage E206 proves to be negative, then the routine returns control to the procedure in FIG. 5 (E211).

Returning to FIG. 5, we notice that all the stages E5, E8, E9, E10 and E14 are repeated for each remote controller.

If the result of the test in stage E5 is negative, or if the test in stage E14 is positive or after the two routines described above (E9 and E10), we determine whether the index n corresponds to its maximum N (E6). If this is not the case, the index is incremented (E7) and stage E5 is repeated.

Once all the remote controllers have been treated, we determine whether the current pulse has been used to assign a bit to one of the remote controllers (E11). If not, we assume that an interpretation error has been made for one of the bits previously written to one of the memories.

The function of the third routine "Check last bit" (E12) is to correct this interpretation error. Afterwards, the parameters concerning this pulse are memorized in the memory 4 (E13).

Figure 9A:
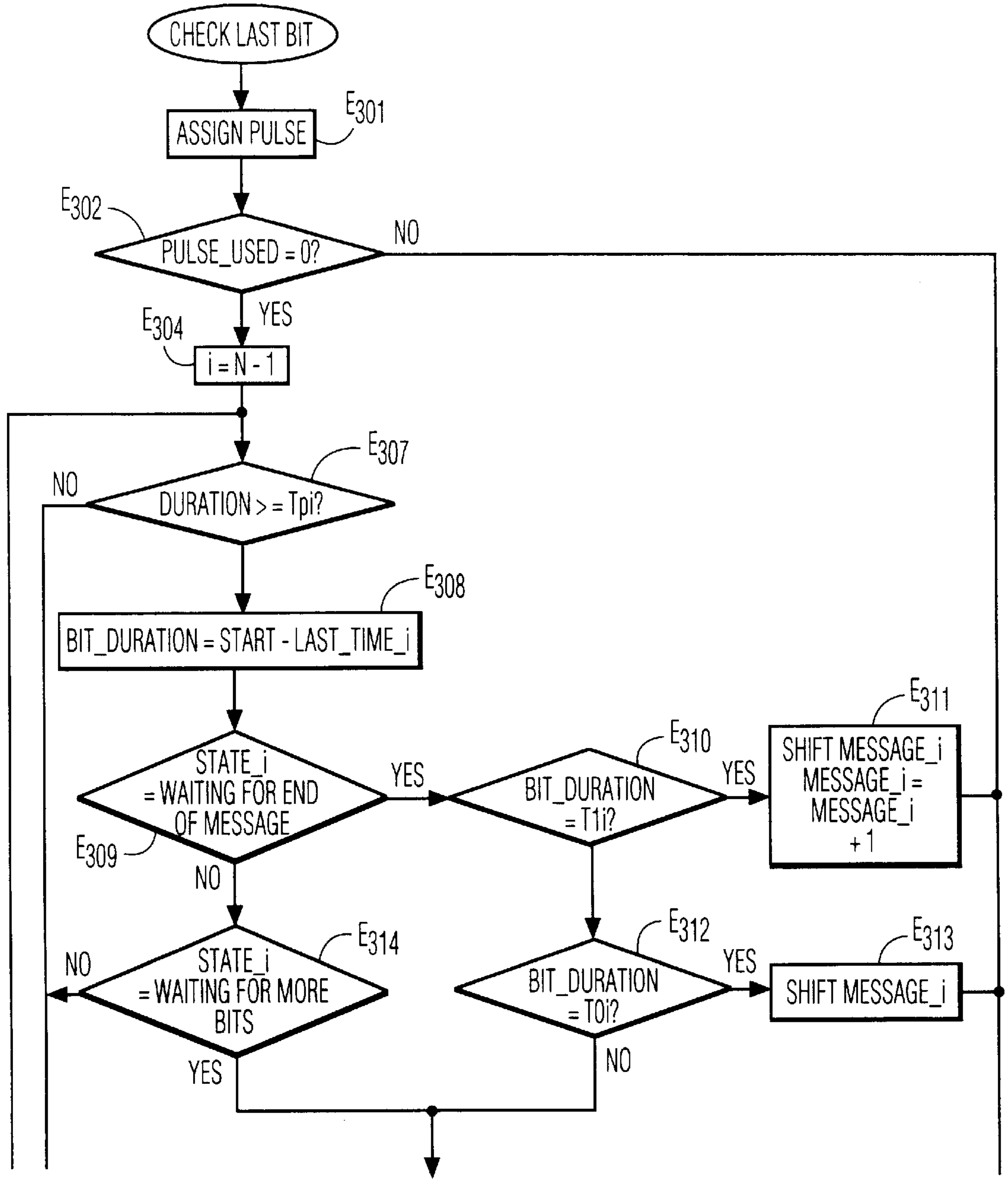
FIGS. 9*a* and 9*b* together show a flow chart of a third sub-routine ("Check last bit") of the procedure in FIG. 5.
Figure 9B:
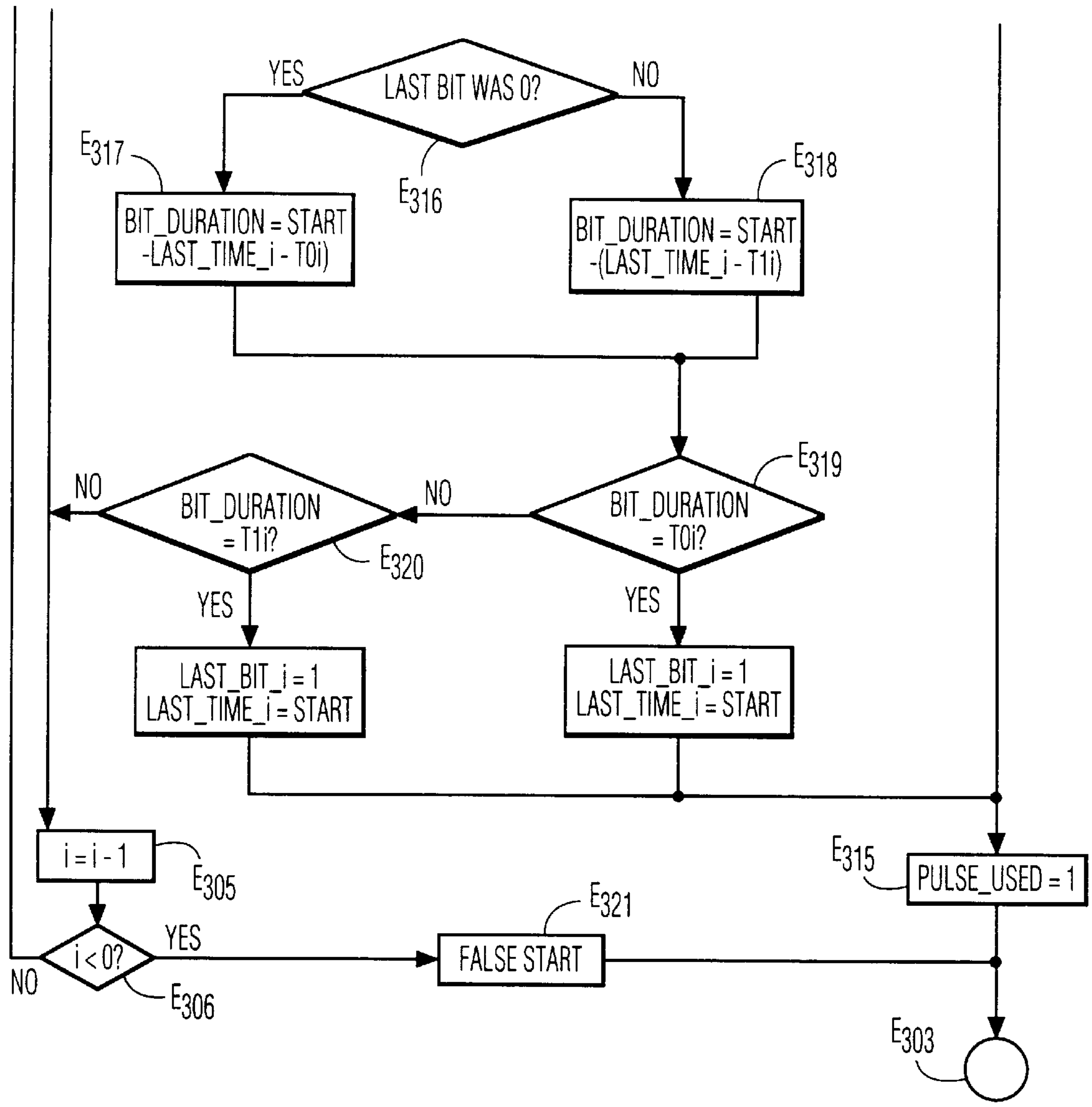

The general principal of this "Check last bit" routine is illustrated by the flow chart of FIGS. 9*a* and 9*b*.

First, in stage E301, we check whether the current pulse is the first pulse of a message sent by one of the remote controllers. This pulse has not been used during one of the two sub-routines E9 or E10 for the assignment of a bit. The first pulse assigned to a remote controller does not enable a bit to be assigned, since a bit is defined by the time interval between two rising edges of successive pulses. The use of the variable "Pulse_assigned_i" enables a pulse to be assigned to a single remote controller whose state is "Waiting for first bit".

Stage E301 thereby enables certain cases of later correction to be avoided.

Figure 10:
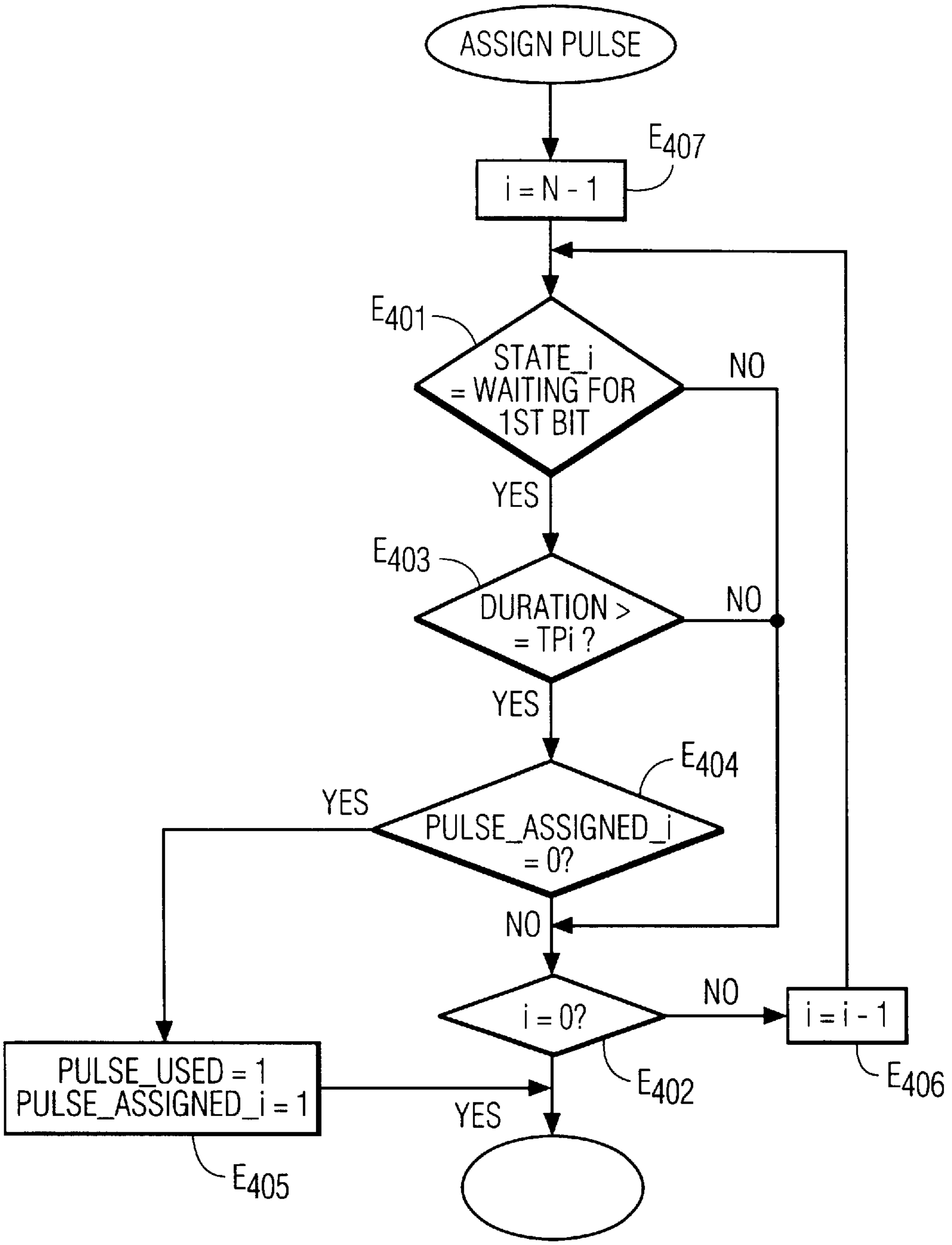
FIG. 10 shows a flow chart of a routine ("Assign pulse") used in the sub-routine in FIG. 9.

Stage E301 is described in more detail by means of the flow chart in FIG. 10.

For each remote controller, the following stages are executed:

First, we check whether the state associated with the remote controller is "Waiting for first bit" (E401). If not, we move to the next remote controller via the loop E402/E406 (the stage E407 is used to initialize this loop); otherwise, we check whether the pulse width Tp is such that it corresponds to the pulse width of the remote controller currently being processed or if it might hide such a pulse (E403). If the result of this comparison is negative, then we try the next remote controller; if the comparison is positive, we check whether a pulse has already been assigned to this remote controller (E404).

A given remote controller can have only one start pulse. This condition is memorized by means of the variable Pulse_assigned_i: if this variable indicates that a pulse has already been assigned (in the present example, this means it has the value 0), then we deduce that the pulse being treated did not come from the remote controller considered and we move on to the next remote controller, if there is one (E404). On the other hand, if no pulse has yet been assigned to the remote controller considered, then the pulse is assigned to it (E405). The pulse is then marked as having been used. In addition, the variable Pulse_assigned_i is set to 1 to indicate that a pulse has been assigned to the remote controller i. If an assignment has been made, then this is the end of the procedure shown in FIG. 10.

The loop of the stage E301 works in decreasing values of the pulse width Tpi. In this way, the pulse will be assigned to the most probable remote controller.

Once the procedure of FIG. 10 is completed, we return to the procedure in FIG. 9. Given that all pulses come from one of the n remote controllers, if no assignment could be made during stage E301, we conclude that there are has been an incorrect interpretation of a previous pulse. In this case, a more detailed analysis is carried out for the remote controllers to which bits have already been assigned.

Figure 11A:
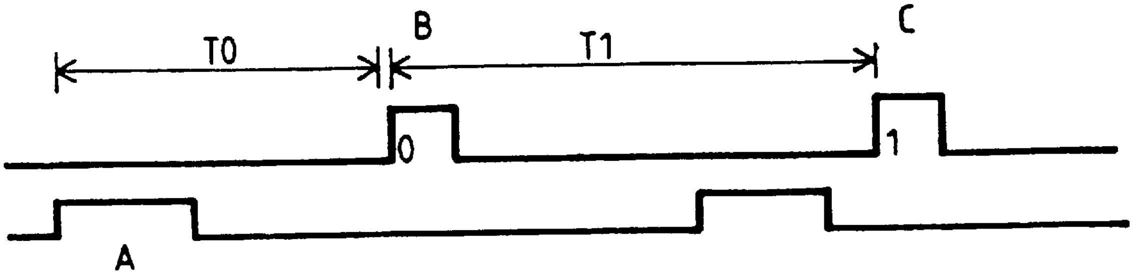
FIG. 11*a* shows a particular configuration of the signals transmitted by the remote controllers which can cause a first error corrected by the sub-routine in FIG. 9.
Figure 11B:
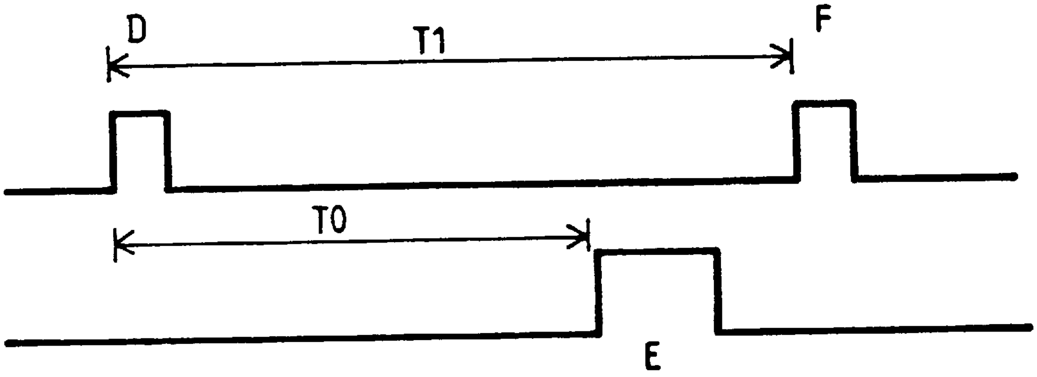
FIG. 11*b* shows a particular configuration of the signals sent by the remote controllers which can cause a second error corrected by the sub-routine in FIG. 9.
Figure 11C:
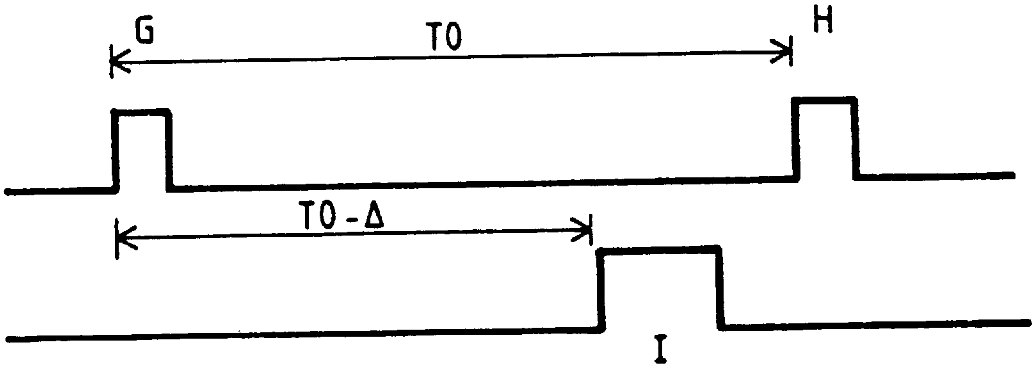
FIG. 11*c* shows a particular configuration of the signals sent by the remote controllers which can cause a third error corrected by the sub-routine in FIG. 9.

Three cases must be considered, illustrated respectively by FIGS. 11*a*, 11*b* and 11*c*.

In a first configuration, we consider the remote controllers whose state is "Waiting for end of message" (C), and determine whether the current pulse could constitute a "0" or a "1" with a pulse previously assigned to these remote controllers. If this is the case, then we assume that the first bit of the message of the remote controller has been incorrectly assigned. This first bit is eliminated and the new bit is added at the end of the message. FIG. 11*a* illustrates a configuration of remote controller signals that could cause such an error.

The first and second lines of FIG. 11*a* correspond respectively to signals transmitted by a first and a second remote controller. The pulse B corresponds to the first pulse transmitted by the first remote controller. The pulse A transmitted by the second remote controller is such that the time interval between its rising edge and the rising edge of a pulse B transmitted by the first remote controller corresponds to the time T01. The "Determine first bit" routine described earlier will detect a "0" for the first remote controller during the analysis of the pulse B. A bit is therefore detected before the actual start of the message. This is due to the fact that a pulse from the first remote controller could be masked by the pulse A, which is wider.

In this case, this first bit detected is eliminated, the whole message is shifted and a "0" or "1" is added, depending on the bit detected during the analysis of the most recently detected pulse.

This first configuration corresponds to the case where the remote controller's state is "Waiting for end of message" but another bit is nevertheless detected for this remote controller.

In a second configuration illustrated in FIG. 11*b*, the rising edge of a pulse of the first remote controller (pulse D) forms with the rising edge of a consecutive pulse of the second remote controller (pulse E) a "0" bit for the first remote controller. The analysis performed by the "Analyze current bit" routine (the remote controller being in state "Waiting for more bits") is such that a "0" bit will be assigned to the first remote controller. If pulse E does not mask a pulse transmitted by the first remote controller, the rising edge of pulse F forms a "1" with the rising edge of pulse D. A "0" would be detected instead of a "1".

Figure 6:
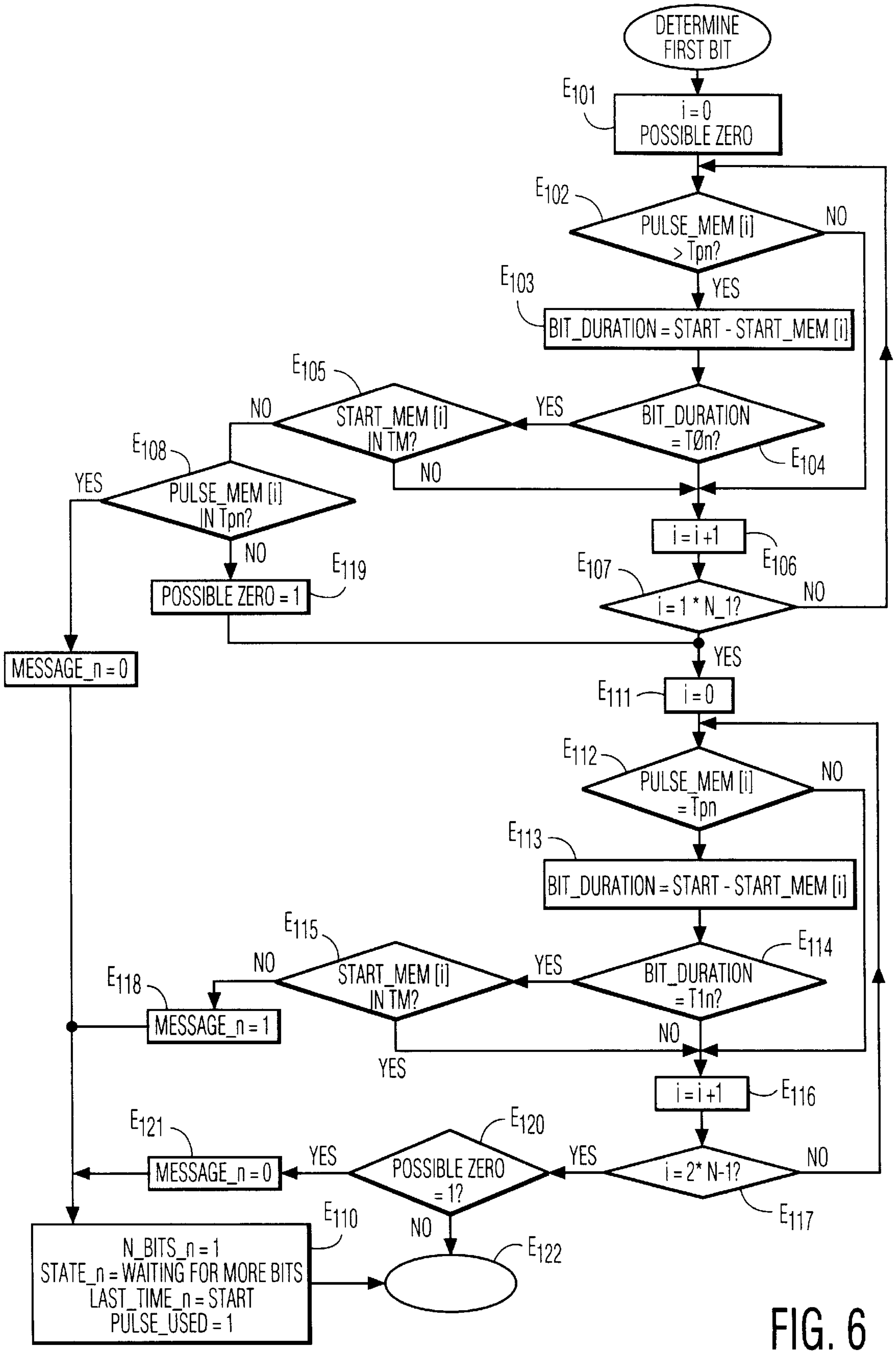
FIG. 6 shows a flow chart of a first sub-routine ("Determine first bit") of the procedure in FIG. 5.

This correction is very similar to that carried out in stage E119 of FIG. 6, but the sub-routine in FIG. 6 concerns only the detection of a first bit, whereas in the present case, the state associated with a remote controller can be different from "Waiting for first bit".

In a third configuration illustrated in FIG. 11*c*, a "0" can be detected at the wrong moment. Let us suppose that the rising edges of two pulses transmitted by a first remote controller (pulses G and H) form a "0". As already mentioned, the test carried out to determine if the duration of a bit corresponds to T0i takes account of an error ±Δ relative to a range about the value T0i. If the time interval between the rising edge of a pulse I transmitted by a second remote controller and the rising edge of the pulse G falls in this range, then a "0" is detected. The value "0" is not in itself incorrect (since the pulses I and H both produce the same result), but the variable "Last_time_i" will contain an incorrect value, which may lead to erroneous interpretation of bits received afterwards.

This third configuration can equally lead to the erroneous detection of "1" bits.

The correction made for the second and third configuration involves checking, during analysis of the pulse F, whether this pulse provides consistent data for a given remote controller in relation to the last-but-one bit. If this information corresponds to a "1" or a "0", the last bit assigned to this remote controller is replaced by this information.

Returning to FIG. 9, we can see more detail of the method used. Stage E301 is now completed and we test in stage E302 whether the pulse has been assigned during stage E301. If so, the three configurations mentioned above do not need to be corrected and the routine is complete (E303).

As before, a loop (via stages E304, E305 and E306) is used to examine each remote controller in turn.

First (E304), we determine whether the pulse being analyzed is identical to or able to mask a pulse coming from remote controller i. If not, we move on to the next remote controller by incrementing the index of the remote controllers (stage E306); otherwise, we determine the bit width (Bit_Duration) corresponding to the time interval between the rising edge of the pulse being analyzed and the last rising edge memorized for the remote controller (Last_time_i).

First we test via stages E309 to E313 whether we are in the first configuration described above (FIG. 11*a*). To do this, we first check whether the state of the remote controller examined is "Waiting for end of message". If not, we then check whether the conditions corresponding to the second and third configurations are satisfied. If so, stage E310 or E312 respectively checks whether the bit width corresponds to a "1" or a "0". If one of the two tests is positive, then the message recorded for the remote controller being examined is shifted and a "1" or "0" is respectively added (stages E311 and E313). The pulse having been used, the routine ends at stage E303, after the most recent pulse has been marked as having been used.

If the first configuration has not been detected or if the state associated with the remote controller is "Waiting for more bits" (test E314), then we check whether the conditions of the second or third configuration (FIGS. 11*b* and 11*c*) are satisfied.

We then determine the value of the last bit memorized for the remote controller examined (E316). We calculate the time interval separating the rising edge of the pulse being analyzed (for example, rising edge of the pulses F or H in FIGS. 11*b* and 11*c* and whose time of arrival is memorized by the variable Start) and the rising edge of the last-but-one pulse memorized (for example, pulses D or G in FIGS. 11*b* and 11*c*). This calculation is performed by computing the time interval between Duration and Last_time_i, and adding T0i or T1i depending on the value of the last bit memorized (stages E317 or E318, respectively).

Then we compare this time interval with the duration of a "0" and "1" bit for the remote controller being examined (durations T0i and T1i in stages E319 and E320). If one of these durations corresponds to the time interval previously calculated, then the last bit memorized for the remote controller is erased and replaced by the new value determined. In addition, the variable indicating the last rising edge of a pulse having led to the assignment of a bit to the remote controller is updated (Last_time_i).

Figure 12:
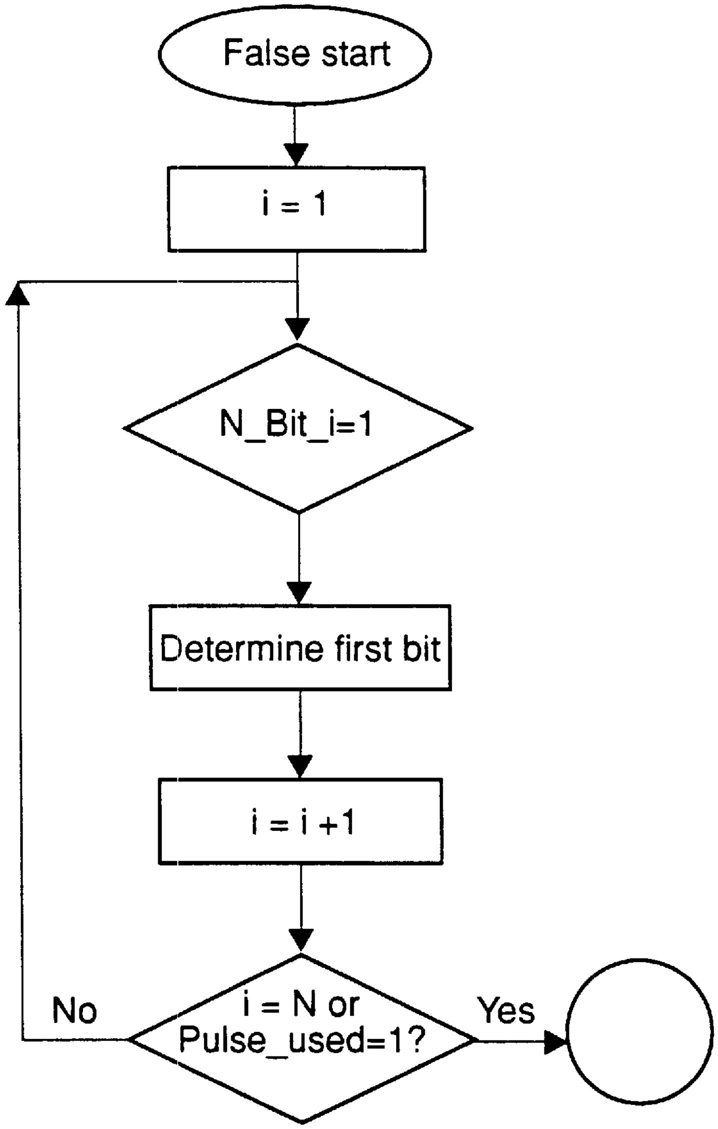
FIG. 12 shows a flow chart of a routine ("False start") used in the sub-routine in FIG. 9.

After the examination corresponding to the three configurations mentioned above, if a pulse could not be assigned to any remote controller, then another routine, called "False start" is called. This routine (E321) is executed only for the remote controllers to which a first bit has been attributed. The corresponding flow chart is shown in FIG. 12. We notice that the "Determine first bit" routine already described is called.

Returning to the main flow chart in FIG. 5, all that remains to do is to validate the messages stored, if necessary, or determine if these messages have been interrupted during transmission.

Figure 13:
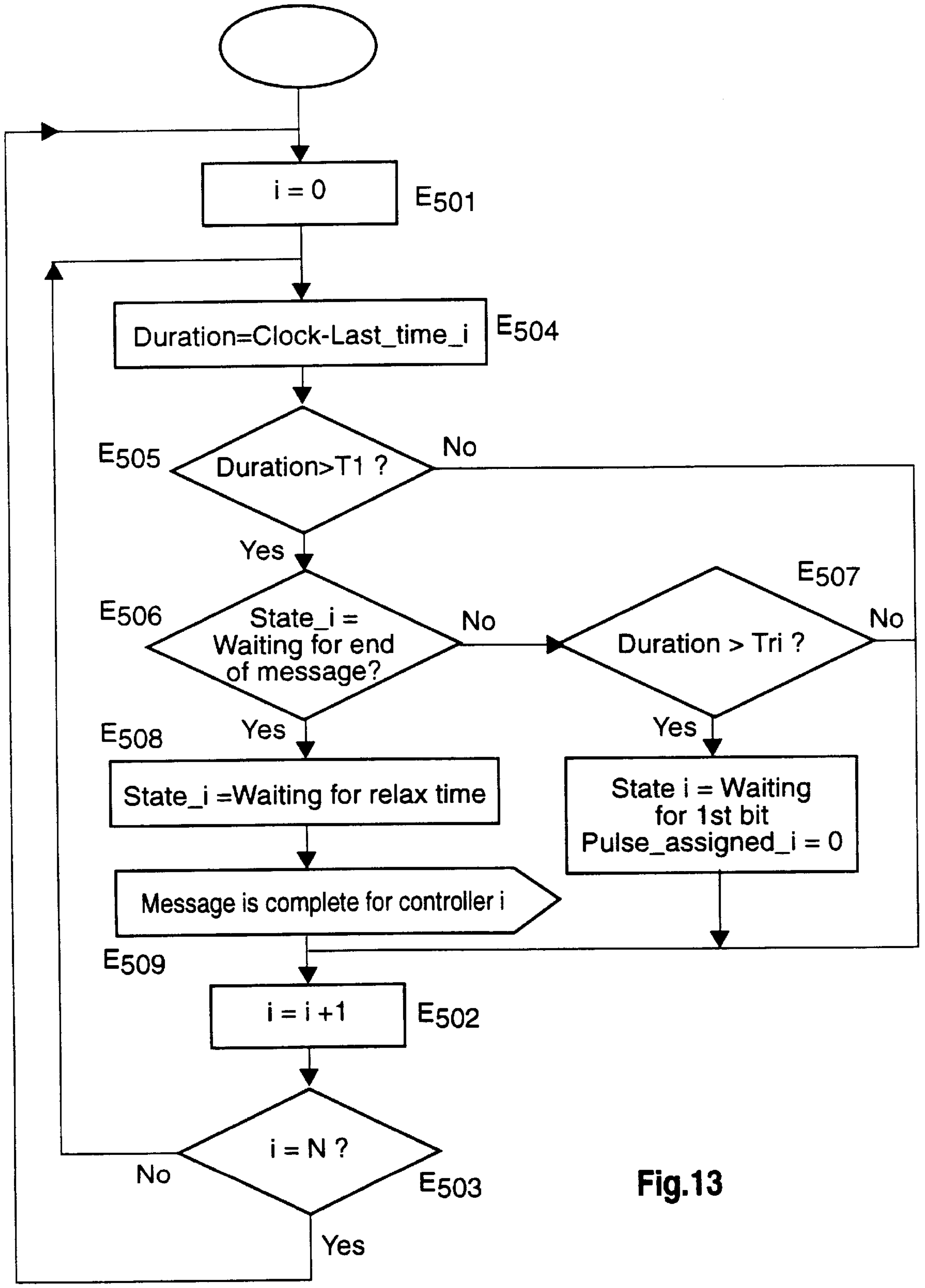
FIG. 13 shows a flow chart of a routine ("End of message") used to detect the interruption or the end of a message.

FIG. 13 shows the flow chart of the corresponding procedure (called "End of message") used in the present embodiment. This procedure is called when no pulse is detected (stage E1). It is also possible to call it in other circumstances.

As before, a loop is used to consider each of the remote controllers in turn (stages E501, E502 and E503).

For each remote controller, we determine the time elapsed since the rising edge of the last pulse assigned to this remote controller by calculating the difference between the system clock and Last_time_i (stage E504). We then check (E505) whether this duration exceeds the largest bit width for this remote controller (T1i in the present example). If this is not the case, we cannot consider the message to be entirely received, since it is not necessarily complete or correct, and a pulse destined for the remote controller can still arrive at the receiver. Consequently, we move to the next remote controller (E502).

On the other hand, if the test of the stage E505 proves to be positive, a priori no future pulse will be assigned to the remote controller considered. Depending on state of the message, it is then considered as complete or interrupted. First we determine if the state of the message is "Waiting for end of message" or not (E506). If not, then we check (E507) whether the time elapse since the last pulse assigned to the remote controller is greater than the relax time of this remote controller. If this is the case, then the message is considered to be interrupted and the state of the message is reset to "Waiting for first bit" (E508). If the duration is less than the relax time, we move to the next remote controller (E502).

If the state of the message is "Waiting for end of message", then this state is changed to "Waiting for relax time (E508). The message is then considered to be complete and can be analyzed in a known manner to determine its meaning (E509). When the routine shown in FIG. 13 is called again later, the state of the message will be reset to "Waiting for first bit", which enables a new message to be received.

The embodiment described above includes a multitude of corrections of various signal configurations. Depending on the required complexity of the device and the processing carried out, certain corrections could be omitted from variants of the embodiment. This would enable the processing to be simplified, although it might be prejudicial to the performance.

Finally, although the embodiment described concerns the coding of bit values, two time intervals (T0i and T1i) being used, the invention is not limited to this type of coding.

There are many potential applications of the invention, including video games, interactive television, control of several devices via a single sensor picking up signals from several remote controllers, and so on.

What is claimed is:

1. Method of reception of signals from at least two transmitters (RCi) wherein each transmitter transmits data items ("0", "1") represented by the time interval (T0i, T1i) between two consecutive pulses transmitted by the transmitter, and wherein said method includes the following steps:

providing a plurality of transmitters wherein each of the transmitters are characterized by the width of their respective pulses and time intervals between pulses;

reception of a resultant signal that is the sum of the signals from said transmitters;

determination of the parameters of said resultant signal, including the width and spacing of the received pulses; and analysis of said parameters and assignment of a data item to one of said transmitters.

2. Method according to claim 1, wherein said data items comprise the two possible values of a bit.

3. Method according to claim 2, wherein a status variable is managed for each transmitter, each of the status variables representing a current status of a message received from a respective transmitter.

4. Method according to claim 3, wherein the possible states represented by said status variable are "Waiting for a first bit of a message", "Waiting for more bits", "Waiting for the end of the message" and "Waiting for the end of the relax time between two messages".

5. Method according to claim 2, wherein a first bit is detected for a given transmitter when the time interval between the current pulse and one of the pulses previously received is equal to one of the intervals (T0i, T1i) defining a bit value for said given transmitter and when the width of said pulse previously received is equal to the pulse width (Tpi) of associated with said given transmitter.

6. Method according to claim 5, wherein a comparison of the time interval between said two pulses with the intervals defining a bit value for said given transmitter is performed by increasing intervals defining a data item, all pulses previously received and stored being examined for each interval defining a bit value until a data item is detected.

7. Method according to claim 6, wherein if on the one hand there is equality between a shortest duration corresponding to a bit value (T0i) and the time interval separating the current pulse and a pulse previously received, and on the other hand no bit value was previously detected for the given transmitter for the current pulse, then the bit value corresponding to the shortest duration (T0i) is chosen as a detected bit value.

8. Method according to claim 5, wherein the given transmitter is considered as the source of a first bit of a message only when the width of the current pulse is greater than or equal to the pulse width (Tp) associated with the given transmitter.

9. Method according to claim 2, wherein when at least one bit has been assigned to a first transmitter, another bit is assigned to the first transmitter if the interval between the last pulse enabling a bit to be assigned to the first transmitter and the current pulse corresponds to the bit interval for the first transmitter.

10. Method according to claim 9, wherein a given transmitter is considered as the source of a supplementary bit of a message only when the width of the current pulse is greater than or equal to the pulse width (Tp) associated with the given transmitter.

11. Method according to claim 5, wherein if the analysis of a current pulse does not enable a bit to be assigned to a transmitter then this pulse is assigned to the first transmitter to which no bit has been assigned, in decreasing order of pulse widths, said pulse thus assigned then defining the starting point of a bit whose second pulse will arrive later.

12. Method according to claim 5, wherein when the number of bits assigned to a particular transmitter is equal to the maximum number of bits in a message, but another bit is nevertheless detected for the particular transmitter, then the first bit of the message is eliminated, and the last bit detected is added to said message.

13. Method according to claim 5, wherein if the analysis of a current pulse does not enable a bit to be assigned to a particular transmitter but the current pulse forms with the next to last pulse stored an interval corresponding to a bit value of a first transmitter, and if at least one bit has already been assigned to the first transmitter, then the last bit assigned to the first transmitter is replaced by the new value added.

14. Method according to claim 13, wherein if a current pulse could not be used before, then a transmitter to which only one bit has been assigned is determined and it is checked whether the interval between the current pulse and the first pulse assigned to said transmitter corresponds to a bit value for said transmitter, and if so then the bit value is assigned to said transmitter.

15. Method according to claim 5, wherein the parameters of each pulse received are memorized after the analysis of said pulse.

16. Method according to claim 4, wherein:

the transition from the state "Waiting for first bit" to the state "Waiting for more bits" is made when a bit is detected;

the transition from the state "Waiting for more bits" to the state "Waiting for end of message" is made when the maximum number of bits has been assigned to a transmitter;

the transition from the state "Waiting for end of message" to the state "Waiting for relax time" is made if no bit corresponding to the transmitter in question is received after a period exceeding the longest interval corresponding to a bit from this transmitter;

the transition from the state "Waiting for relax time" to the state "Waiting for first bit" is made when the period since the last bit received exceeds the relax time (Trn) of the transmitter in question;

the transition from the state "Waiting for more bits" to the state "Waiting for first bit" is made when, after assignment of a first bit, no other bit corresponding to the transmitter in question is received after a period exceeding the longest interval for data from this transmitter.

17. Device for receiving signals, comprising:

means for receiving a resultant signal that is the sum of the signals transmitted by at least two transmitters, the data (0,1)from each transmitter being defined by the time interval between consecutive pulses, each transmitter being characterized by a respective pulse width and time interval between pulses, and means for analyzing said resultant signal based on the pulse widths detected in the resultant signal and the time intervals between these pulses.

18. Device according to claim 17, wherein the pulse widths detected are equal to or proportional to the widths of pulses transmitted by said transmitters.

19. Device according to claim 17, wherein said means of reception include an infra-red receiver, said transmitters transmitting infra-red signals and all using the same carrier.

20. Device according to claim 17, wherein said means of analysis include a microprocessor, a memory used to store the parameters of pulses received, and other memories used to store binary data corresponding to respective messages from said transmitters.

21. A remote control system, comprising:

infra-red remote controller (RC1, RC2) having means of adjusting the width of the pulses used to represent the data transmitted; and a receiver comprising means for receiving a resultant signal that is the sum of the signals transmitted by at least two transmitters, the data (0,1)from each transmitter being defined by the time interval between consecutive pulses, each transmitter being characterized by a respective pulse width and time intervals between pulses, and means for analyzing said resultant signal based on the pulse widths detected in the resultant signal and the time intervals between these pulses.

22. The remote control system according to claim 21, wherein said infra-red remote controller includes means of adjusting the time intervals between two pulses that represent the data (0,1)being transmitted.

23. The remote control system according to claim 22, wherein said infra-red remote controller comprises a plurality of infra-red remote controllers, each said infra-red remote controller characterized by a respective pulse width and time intervals between pulses.

* * * * *